United States Patent
Sangiovanni (10) Patent No.: US 12,141,070 B2
(45) Date of Patent: Nov. 12, 2024

(54) IN-MEMORY CACHING SYSTEM FOR FLEXIBLE TIME DIMENSION

(71) Applicant: Business Objects Software LTD, Dublin (IE)

(72) Inventor: Raffaele Sangiovanni, Dublin (IE)

(73) Assignee: BUSINESS OBJECTS SOFTWARE LTD, Dublin (IE)

( * ) Notice: Subject to any disclaimer, the term of this patent is extended or adjusted under 35 U.S.C. 154(b) by 38 days.

(21) Appl. No.: 18/061,907

(22) Filed: Dec. 5, 2022

(65) Prior Publication Data

US 2024/0184705 A1    Jun. 6, 2024

(51) Int. Cl.
*G06F 12/0871*    (2016.01)

(52) U.S. Cl.
CPC ...... *G06F 12/0871* (2013.01); *G06F 2212/45* (2013.01)

(58) Field of Classification Search
CPC .......... G06F 12/0871; G06F 2212/45
See application file for complete search history.

(56) References Cited

U.S. PATENT DOCUMENTS

| | | | | |
|---|---|---|---|---|
| 6,772,203 B1* | 8/2004 | Feiertag | ................ | G06F 16/957 709/219 |
| 2005/0262306 A1* | 11/2005 | Nenov | .................. | G06F 12/128 711/170 |
| 2008/0189383 A1* | 8/2008 | Schuh | ................. | G06F 16/9574 709/214 |

* cited by examiner

*Primary Examiner* — Kalpit Parikh
(74) *Attorney, Agent, or Firm* — Fountainhead Law Group, PC (57) ABSTRACT

Computer-readable media, methods, and systems are disclosed for an in-memory cache in a memory of a client device. The system may send a first request for a first data from the client device to the in-memory cache and may receive a null response. The system may send a second request from the client device for the first data to a server and may receive a response from the server with the first data. The system may then send the first data to the in-memory cache and store the first data in the in-memory cache, thereby eliminating an additional request for the first data from the server.

20 Claims, 10 Drawing Sheets

IN-MEMORY CACHING SYSTEM FOR FLEXIBLE TIME DIMENSION

TECHNICAL FIELD

Embodiments generally relate to an improved memory storage system, and more particularly to an in-memory caching system and method.

BACKGROUND

Over the past decade, cloud computing adoption has seen explosive growth at both consumer and enterprise levels. Legacy software providers have made concerted efforts to encourage users of their on-premises software offerings to upgrade to their cloud equivalents. It is no longer a question of whether a company will undergo a cloud transformation. Rather, the questions surround what services and operations should be migrated into the cloud.

Cloud migration is the process of moving a company's digital assets, services, databases, IT resources, and applications either partially, or wholly, into the cloud. The migration of services on the cloud, introduces an evolution of the software architecture. In a traditional on-premise system most of the services have been served/provided within the client, or in a closed infrastructure, which may be owned by the user or customer. In a cloud-based system, most of the services are provided by an external and shared server, which is in the cloud.

The fundamental difference between cloud vs on-premises software is where it resides. On-premise software is installed locally, on local computers and servers, whereas cloud software is hosted on the vendor's server and accessed via the Internet.

Beyond the pros and cons regarding the adoption of the cloud, it undoubtedly introduces problems to be taken into consideration during the evolution of the software. Considerations include security, physical control of equipment, data breaches, cost, connectivity, and performance.

The topmost concern in investing in cloud services is security issues in cloud computing because data gets stored and processed by a third-party vendor. The effectiveness and efficiency of traditional protection mechanisms are being reconsidered as the characteristics of this innovative deployment model can differ widely from those of traditional architectures.

Physical control of the private cloud equipment is more secure than having the equipment off site and under someone else's control. Physical control and the ability to visually inspect data links and access ports is required in order to ensure data links are not compromised.

Cloud computing offers many benefits but is vulnerable to threats. As cloud computing uses increase, it is likely that more criminals find new ways to exploit system vulnerabilities. Many underlying challenges and risks in cloud computing increase the threat of data compromise. To mitigate the threat, cloud computing stakeholders may invest in risk assessment to ensure that the system encrypts to protect data, establishes trusted foundation to secure the platform and infrastructure, and builds higher assurance into auditing to strengthen compliance. Security concerns must be addressed to maintain trust in cloud computing technology.

Data breach is a big concern in cloud computing. A compromised server could significantly harm the users as well as cloud providers. A variety of information could be stolen including include credit card and social security numbers, addresses, and personal messages.

While most of the arguments for cloud storage are based around cost, it is important to know and properly setup a cloud system in order to avoid overpaying for unnecessary resources and services. The cost of enterprise cloud storage can vary greatly dependent on accessing data, capacity stored, retrieval frequency and network bandwidth.

The cloud services are dependent on a high-speed internet connection. When an application moves to a cloud or a third-party vendor, the performance may be dependent on the provider as well. Another major problem in cloud computing is investing in the right cloud service provider. The cost of a cloud system is calculated based on the resource involved to provide a given service. This aspect must be considered during the evolution/migration of software to a cloud system.

SUMMARY

Disclosed embodiments address the above-mentioned problems by providing one or more non-transitory computer-readable media storing computer-executable instructions that, when executed by a processor, perform a method for in-memory caching of data, the method including: providing an in-memory cache in a memory of a client device; sending a first request for a first data from the client device to the in-memory cache; receiving a null response; sending a second request from the client device for the first data to a server; receiving a response from the server with the first data to the client device; sending the first data to the in-memory cache; and storing the first data in the in-memory cache.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present teachings will be apparent from the following detailed description of the embodiments and the accompanying drawing figures.

BRIEF DESCRIPTION OF FIGURES

Embodiments are described in detail below with reference to the attached drawing figures, wherein.

The drawing figures do not limit the present teachings to the specific embodiments disclosed and described herein.

The drawings are not necessarily to scale, emphasis instead being placed upon clearly illustrating the principles of the disclosure.

DETAILED DESCRIPTION

The interaction between client and server can be improved through a caching mechanism to enhance their communication. A cache is a hardware or software component that stores data so that future requests for that data can be served faster. Disclosed herein is an in-memory caching system to improve the communication performance and throughput between the client and server.

An embodiment disclosed herein can avoid performing the same service calls (to obtain the same response) multiple times. This would improve the overall performance of the application and lower/reduce payment costs through avoiding unnecessary calls of the service. In an embodiment, the answers previously obtained from a server can be saved on the client (for a suitable time period). This will reduce the numbers of calls needed and significantly improve the performance since the client can provide the result of the service immediately, avoiding the overhead of the network as well as the elaboration from the server.

Figure 1:
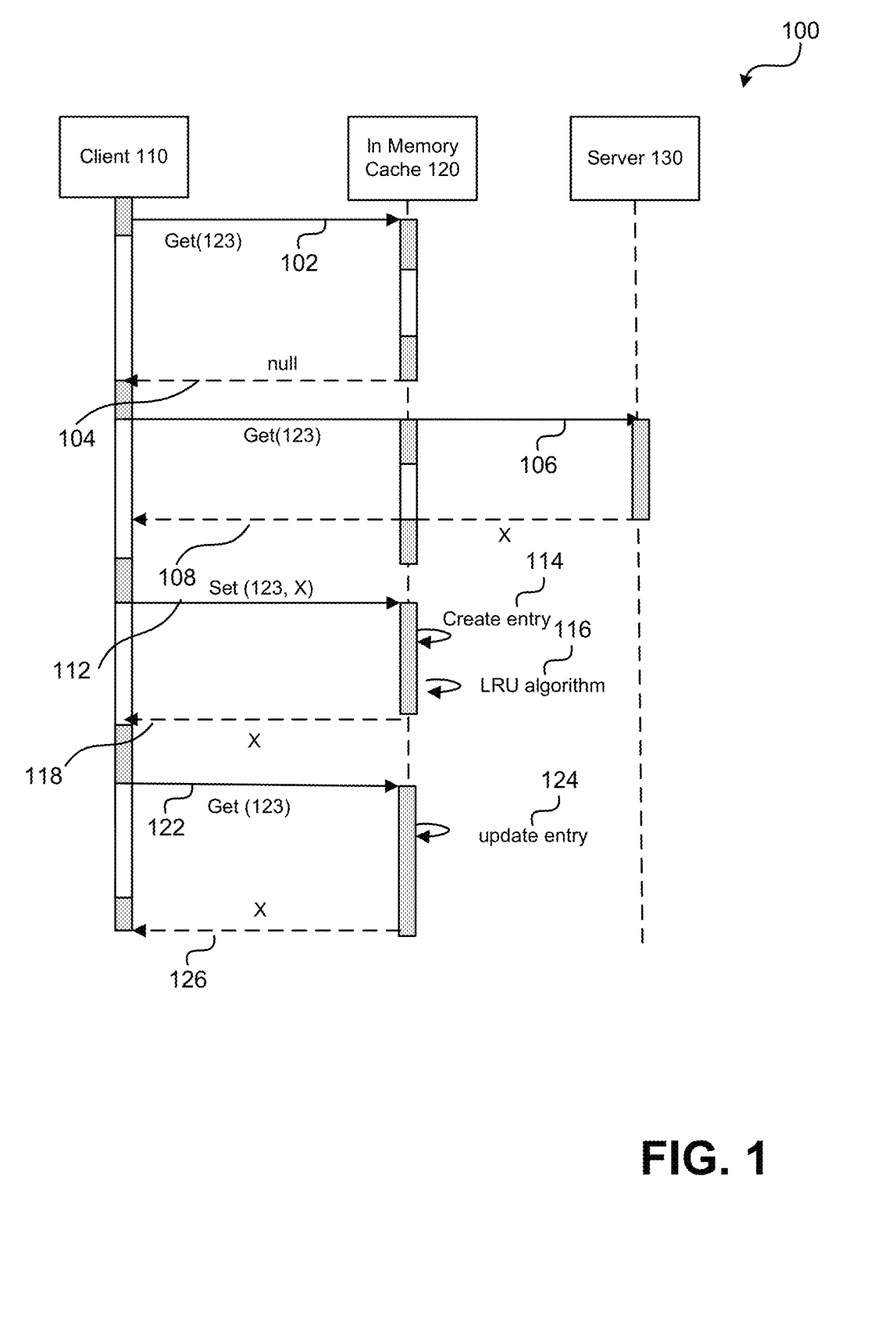
FIG. 1 shows an exemplary system having a client, an in-memory cache, and a server.

FIG. 1 shows a system 100 having client 110, in-memory cache 120, and server 130. Client 110 may be a computer hardware or software device, including a mobile device. In-memory cache 120 is a data storage layer that resides on the memory of the client 110 and sits between client 110 and server 130 to deliver responses with high speeds by storing data from earlier requests or copied directly from the server. Reading data from memory is faster than from the network. In-memory caching avoids latency and improves online application performance.

As seen in FIG. 1, a first call 102, such as "Get(123)", may be made from client 110 to in-memory cache 120. If this is the first time that this call has been made, the in-memory cache 120 will return "null" at 104. Then, client 110 must perform a second identical call 106, such as "Get(123)", to server 130. Server 130 will return "X" to the client 110 at 108. Client 110 can then store the received data in the in-memory cache 120 by the call 112, such as Set (123, X). Storing may include creating a new entry at 114 and applying a caching eviction policy algorithm at 116, as described below. In-memory cache 120 can then return "X" at 118 to client 110.

Then, a subsequent call 122, such as "Get(123)", from client 110 to the same service will be received by the in-memory cache 120 and not need to call the server 130. In-memory cache 120 can then update the previously created entry at 124 and return "X" at 126, thus avoiding an additional network communication between client 110 and server 130 and improving the overall performance.

To prevent the cache size from going over the maximum limit, different caching eviction policies may be applied. In an embodiment, the cache removes elements when the maximum size is reached, according to the rules set by the eviction policy. Several methods can be implemented depending on the desired application, such as: least recently used (LRU), least frequently used (LFU), most recently used (MRU), or first in first out (FIFO).

The least recently used (LRU) policy evicts the data that was least recently used first. The least frequently used (LFU) policy evicts data that was least frequently used. Thus, under the LFU policy, data that is set to be removed might have been used recently but was not used as often as the rest of the data. The most recently used (MRU) policy removes data that was mostly recently used. The first in first out (FIFO) policy removes data that was added in first or least recently. FIFO is unrelated to usage and is based solely on when the data was entered into the cache. In an embodiment, a LRU eviction policy was utilized.

Figure 2A:
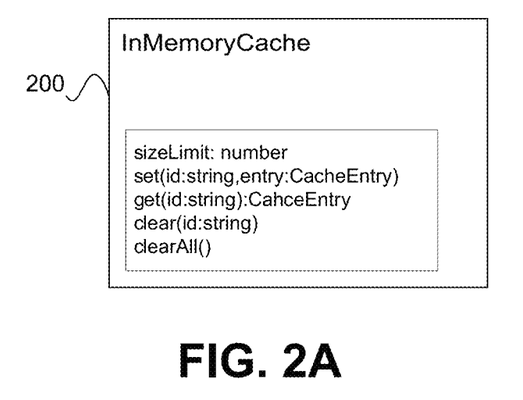
FIG. 2A illustrates an exemplary in-memory cache object.

As seen in FIG. 2A, in-memory cache object 200 provides the following methods: sizeLimit: maximum size allowed by the cache; set( ) add an entry into the cache; get( ) get an entry from the cache (if present); clear( ) remove one entry from the cache; and clearAll( ) clear the whole cache.

Figure 2B:
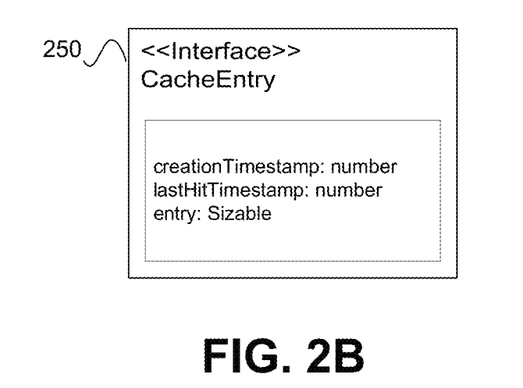
FIG. 2B illustrates an exemplary cache entry.

As seen in FIG. 2B, every CacheEntry 250 is indexed in the cache through an id (a string). As well as the proper entry, the CacheEntry includes: creation Timestamp, which represents the creation timestamp when a cached entry was created first (set) and lastHitTimestamp, which represents the last timestamp when a cached entry has been hit (get). creation Timestamp and lastHitTimestamp are both used for the LRU eviction policy. The CacheEntry can contain additional properties as necessitated by the applied eviction policy.

Figure 3:
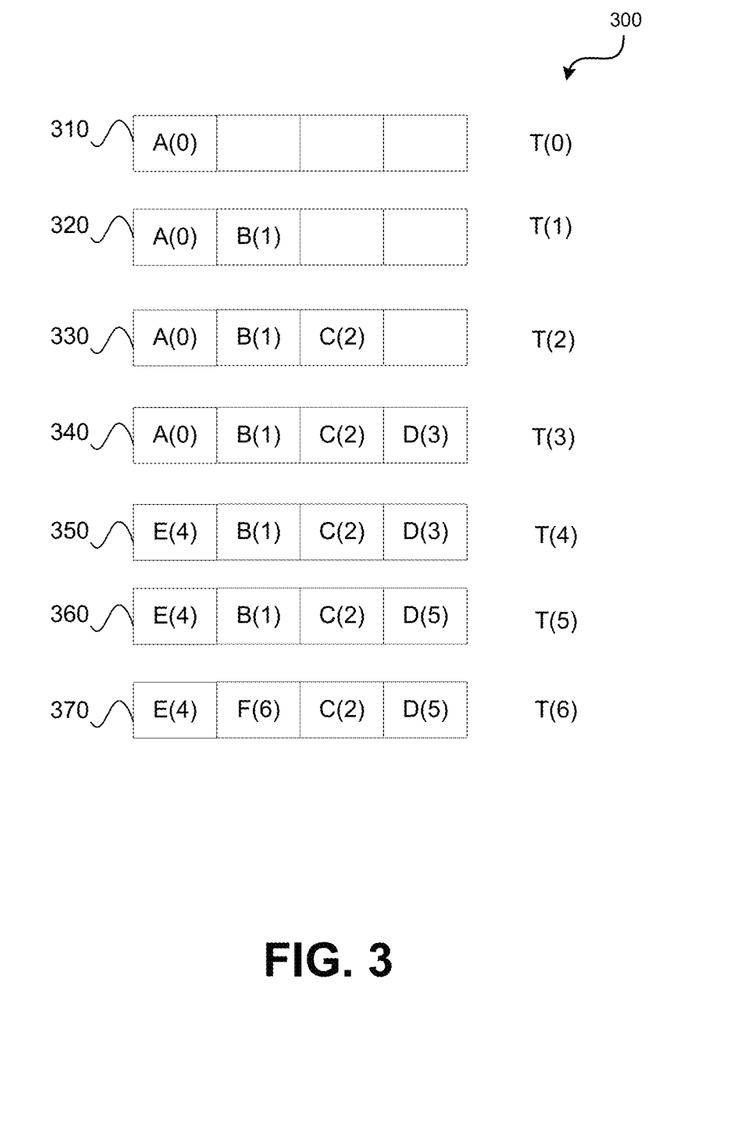
FIG. 3 illustrates the least recently used eviction policy.

As seen in FIG. 3, when the method is called on the in-memory cache 120, and a new entry is inserted, if the cache size limit is reached, the Least Recently Used (LRU) starts. LRU policy discards the least recently used items first, using the lastHitTimestamp recorder for each entry. In the example of FIG. 3, the cache size limit is 4. A(0) means the entry A was accessed last time at timestamp (lastHitTimestamp) 0; and the access sequence is A, B, C, D, E, D, F. At step 310, A is inserted into the cache at timestamp 0. At step 320, B is inserted into the cache at timestamp 1. At step 330, C is inserted into the cache at timestamp 2. At step 340, D is inserted into the cache at timestamp 3. At step 350, E is accessed. Step 350 is a cache miss because E is not already located in the cache, and E is inserted into the cache at timestamp 4. However, the cache size limit is reached when E is inserted into the cache (5>4). Thus, according to the LRU eviction policy, E will replace A, since A has the lowest timestamp (A(0)).

At step 360, D is accessed at timestamp 5 and D's timestamp is updated D(5). At Step 370, F is accessed. Step 370 is a cache miss because F is not already located in the cache, and F is inserted into the cache at timestamp 6. However, the cache size limit is again reached when F is inserted into the cache (5>4). Thus, according to the LRU eviction policy, F will replace B since B now has the lowest timestamp (B(1)).

In an embodiment, a cache mechanism is utilized to overcome a performance issue with the flexible time dimension functionality. The flexible time dimension functionality requires a back end call through an information access (InA) layer, and is currently enabled only with an asynchronous call. The present disclosure provides a solution for a synchronous call for the flexible time dimension functionality.

A synchronous call denotes a call to a service that is executed in a sequence, with the service call waiting for the previous service call to complete before executing. A synchronous call will block a program from updating until it completes. An asynchronous call denotes a call to a service that is executed without waiting for any previous service call to complete. An asynchronous call enables a program to continue operating while waiting for the call to complete.

Figure 4:
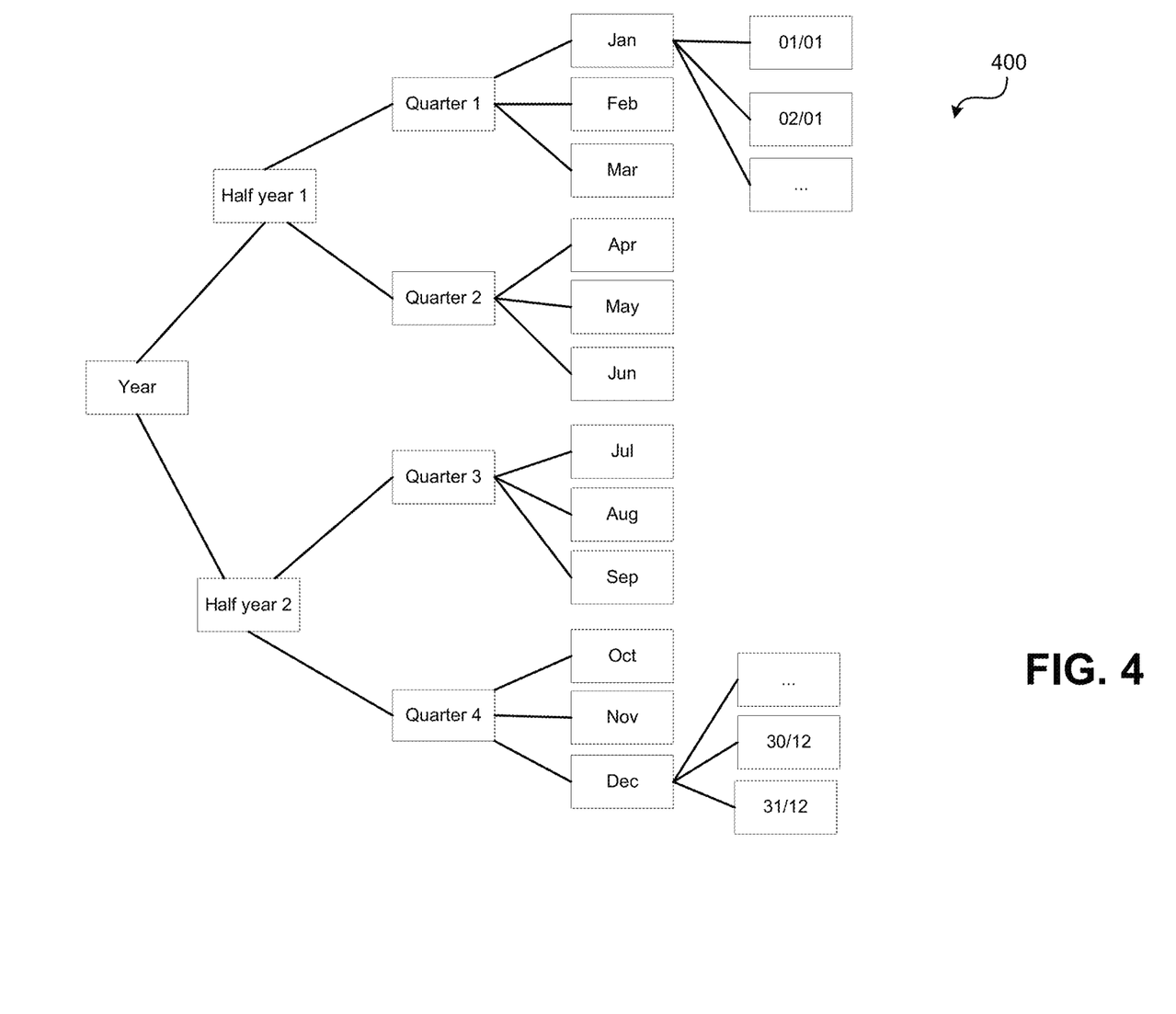
FIG. 4 illustrates a standard time (restrictive) time hierarchy.

A standard time dimension in a time hierarchy is restrictive and follows predefined patterns that are not customizable. An example of a restrictive time hierarchy 400 is shown in FIG. 4. The restrictive time hierarchy 400 can include a year, 2 half years, 4 quarters, 12 months, and up to 31 days in each month as defined by a standard calendar.

Such a restriction limits the design and consumption of models with custom time hierarchies or custom time properties. However, users have use cases where they need to plan and analyze their data along an individual time hierarchy. For example, this includes storing data on week granularity or flagging special time periods (e.g., holiday season). Moreover, it is a common need in financial planning and reporting to have a 13th or 14th (special) period for adjustment postings.

Figure 5:
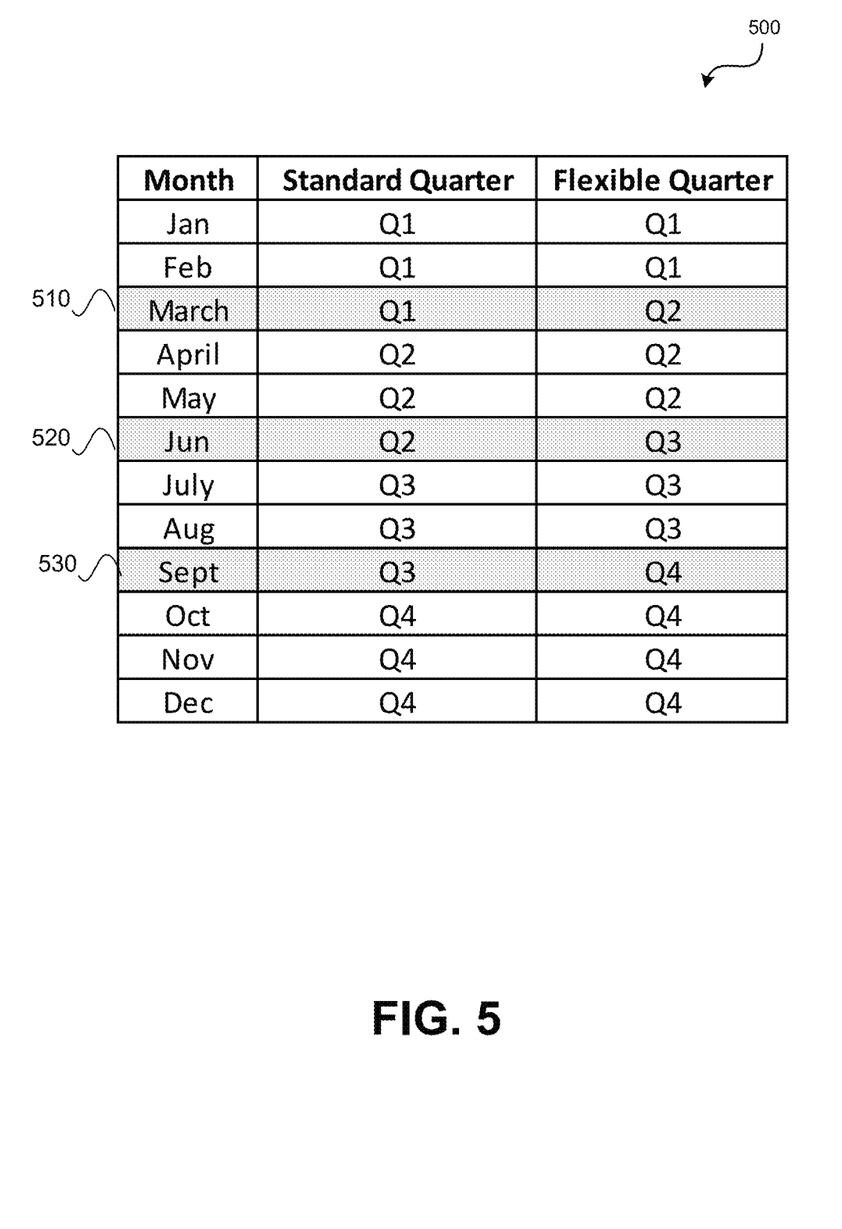
FIG. 5 illustrates a flexible time dimension example.

An example scenario 500 where flexible time dimensions would be of benefit is shown in FIG. 5. Within the scenario, a user/customer requirement can define March to be considered part of Quarter 2 (Q2) instead of part of Quarter 1 (Q1) at 510. Additionally, a user/customer requirement can define June to be considered part of Quarter 3 (Q3) instead of Q2 at 520, and September to be considered part of Quarter 4 (Q4) instead of Q3 at 530.

The flexibility implies more complexity. For a standard time dimension, one can implicitly perform any logic (September will belong always to Q3) and any usual operations (increment, decrement, casting to a specific hierarchy . . . ) without any specific support on the client from the server. However, a flexible time dimension follows rules defined by the user (September can belong to Q3 or Q4), and only the server can provide that information.

So, for the flexible time dimension, it was impossible to depend on the actual logic implemented for the standard time dimension. Rather, a numbers of server calls must be introduced to perform inferences and operations with dates. These calls can be provided through the Information Access (InA) layer. The Information Access (InA) infrastructure enables applications to perform analytics, planning, and search on data stored in an application, such as SAP HANA. It also defines the protocol for the format of the request and the response between the client and the server.

Figure 6:
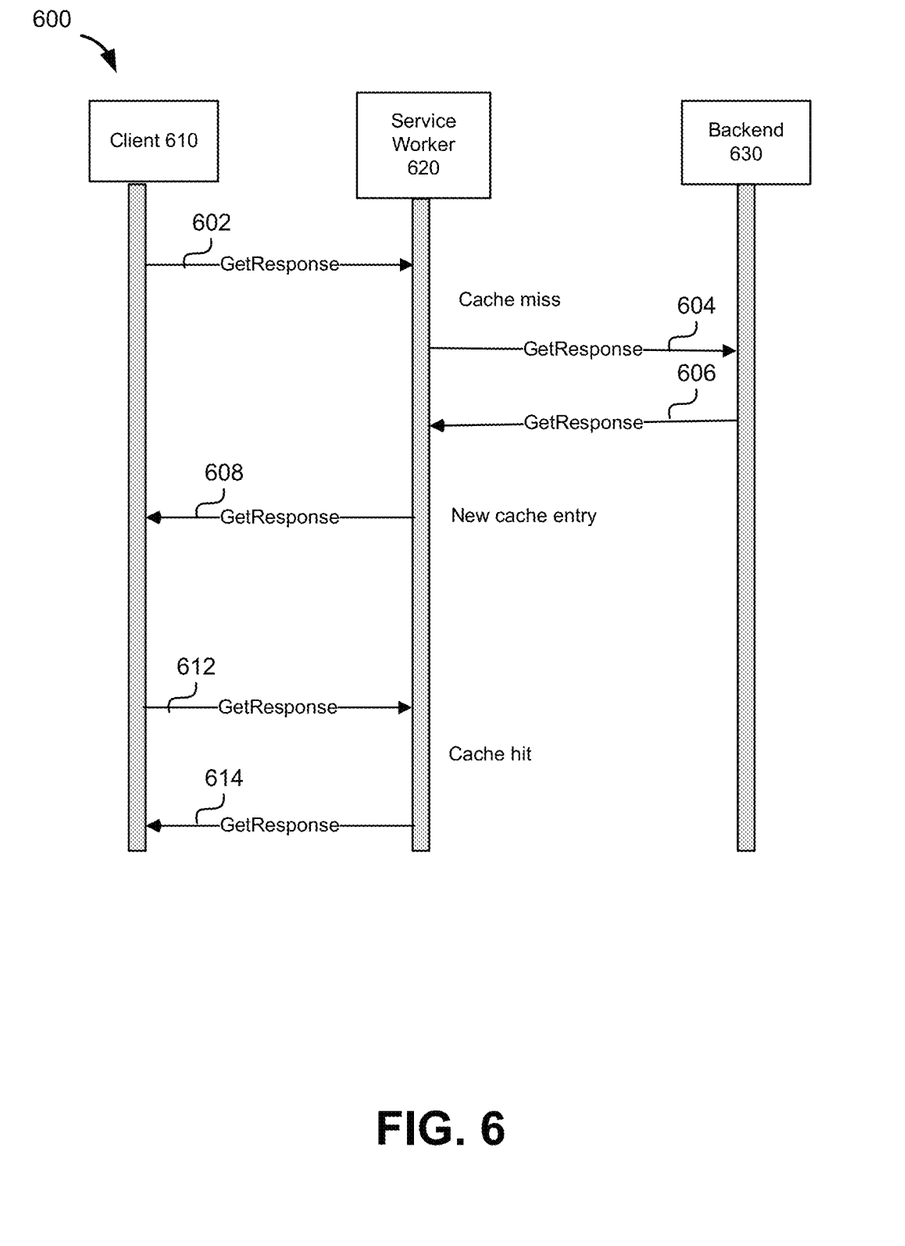
FIG. 6 shows a system including a client, a service worker, and a backend.

As seen in FIG. 6, a query caching mechanism avoids duplicate queries to the InA server. System 600 includes client 610, service worker 620, and backend 630. Service worker 620 intercepts all HTTP (InA) requests (GetResponse) and caches the response. A service worker is a script that the web browser runs in the background, separate from the web page. However, only the asynchronous calls are intercepted and served by service worker 620. Any synchronous calls will not take advantage of InA cache.

As seen in FIG. 6, a first request 602 sent from client 610 to service worker 620 is a cache miss. Thus, a second request 604 is then sent from service worker 620 to backend 630. A response 606 is sent from backend 630 to service worker 620, and then a response 608 is sent from service worker 620 to client 610. A second request 612 sent from client 610 to service worker 620 is a cache hit. Thus, a response 614 is sent from service worker 620 to client 610. However, this system 600 is not applicable to synchronous calls.

In an embodiment, a caching mechanism is used for caching synchronous InA query, performed for flexible time dimension. This enables the efficient migration of UI components consisting of synchronous queries to InA query infrastructure designed for asynchronous queries. Through utilizing of client caching, significant performance improvements are achieved where multiple interactions with back-end service calls exist. The present disclosure also enables the removal of significant refactoring costs generally associated with migrating synchronous call functionality to asynchronous framework. Furthermore, through mitigating the refactoring need, the risk of functionality regression because of such refactoring is reduced. The present disclosure provides an agnostic client caching solution that can be applied to any context, such as where UI components consists of synchronous calls requiring incorporation with InA query infrastructure.

The flexible time dimension component continues to direct calls through the InA infrastructure, ensuring the InA query infrastructure remains the single point of communication with all backend services. A responsive performance with the flexible time dimension components can be achieved within a reasonable timeframe.

In an embodiment, a caching mechanism is provided for synchronous InA query for a flexible time dimension. In an embodiment, a caching mechanism is applicable to any UI component requiring integration with an InA Query infrastructure supporting the caching of asynchronous calls.

Figure 7:
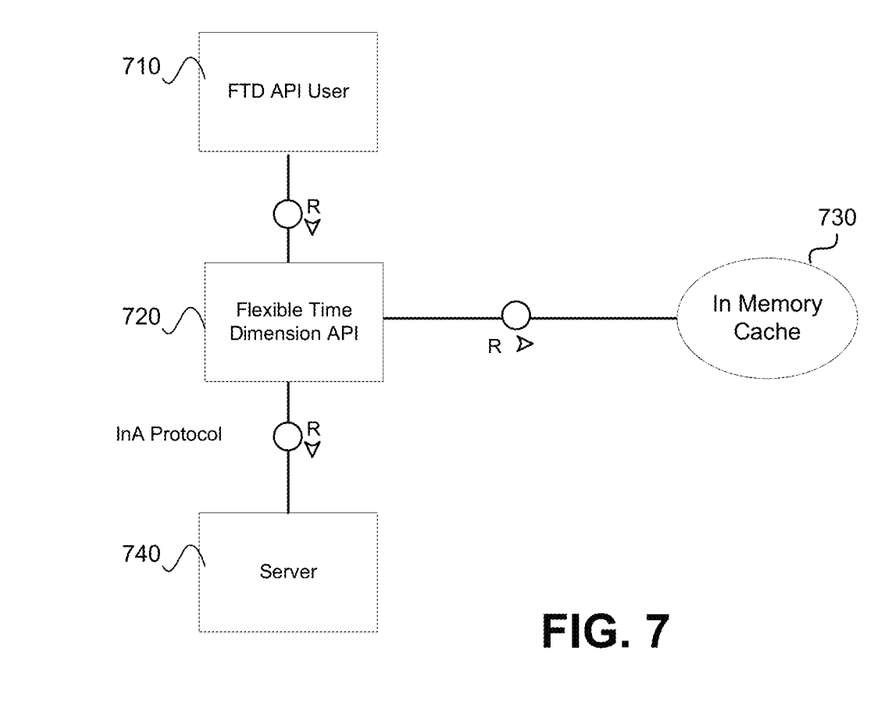
FIG. 7 illustrates the high-level architecture of an exemplary in-memory cache system.

FIG. 7 illustrates the high-level architecture of the in-memory cache system. Flexible Time Dimension (FTD) API user 710 groups all the components that needs to perform logic and operations on a flexible date. Flexible Time Dimension API 720 is the set of components that provide the flexible time dimension API to the consumers. In-memory cache 730 is the cache component as described herein. FTD API user 710, FTD API 720 and in-memory cache 730 are all provided on the client side and 740 is the back-end. Server 740, such as MultiDimensional Services (MDS), provides multidimensional data through an InA protocol. In an embodiment, server 740 provides the structure of a time dimension (its metadata) and perform operations on it. As shown in FIG. 7, In-memory cache 730 is located at Flexible Time Dimension API level 720 that provides a cached response in order to avoid calling MDS, through InA protocol.

Figure 8:
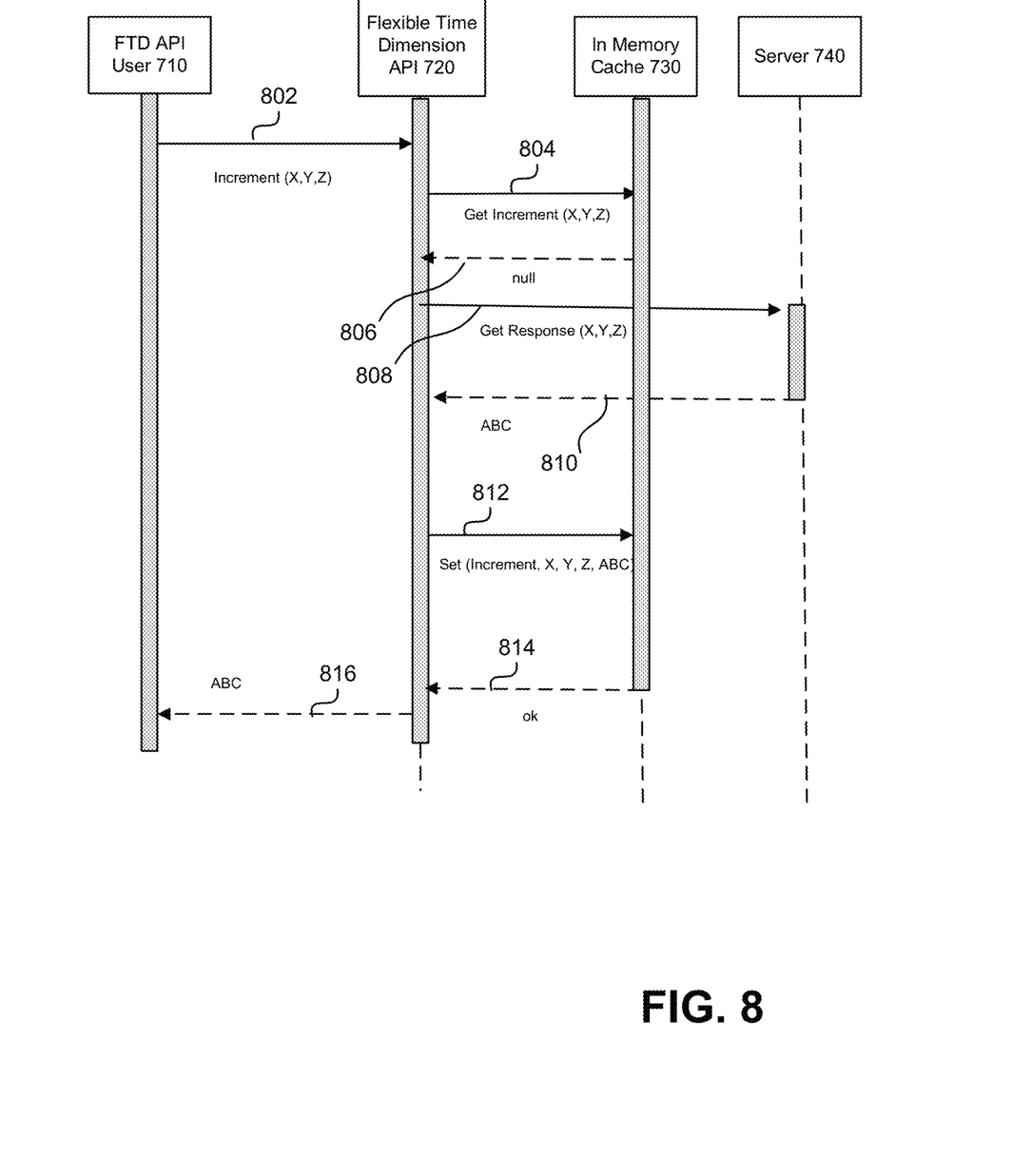
FIG. 8 shows a sequence diagram of a cache miss scenario.

The sequence diagram in FIG. 8 shows the cache miss scenario when the response was not found in the in-memory cache 730. At 802, the Flexible Time Dimension API increment( ) is called. First the in-memory cache 730 is checked at 804, to see if the response was already cached. There is no entry in the in-memory cache 730, resulting in a null response 806. Then, Flexible Time Dimension API 720 performs a InA query 808 on the server 740 and returns a result at 810 to the Flexible Time Dimension API 720. At 812, the result is stored in the in-memory cache 730. The result is returned to the caller, FTD API user 810, at 814 and 816.

Figure 9:
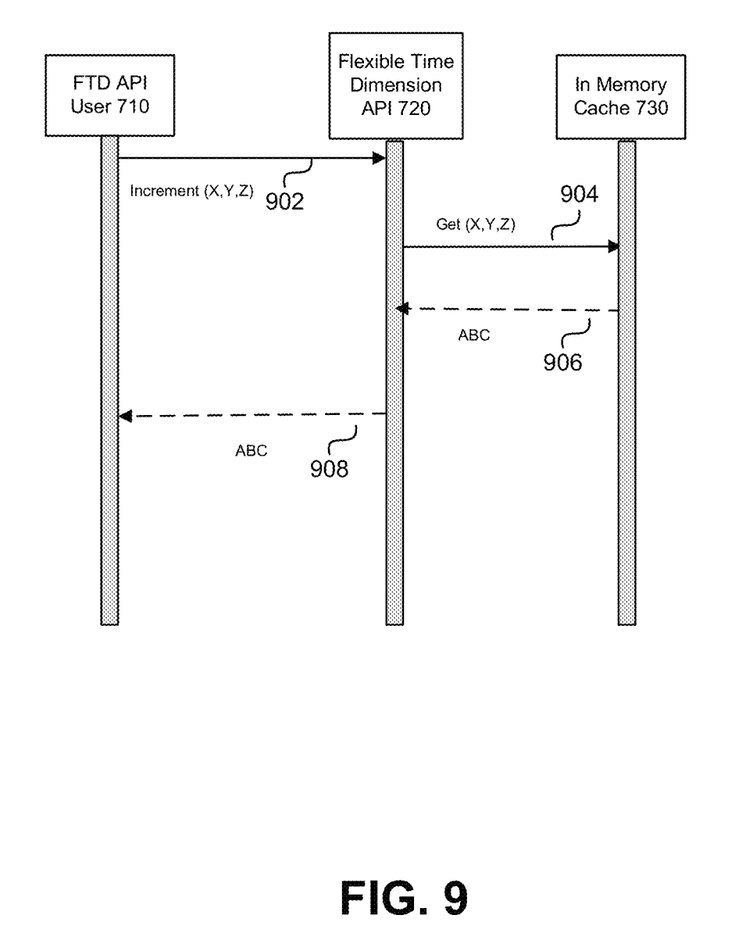
FIG. 9 shows a sequence diagram of a cache hit scenario.

The sequence diagram in FIG. 9 shows the cache hit scenario when the request was found in the in-memory cache 730, thus there is no interaction with the back-end server required. At 902, the Flexible Time Dimension API increment( ) is called by FTD API user 710. First, the in-memory cache 730 is checked at 904, to see if the response was already cached. Since there is an entry cached in the in-memory cache 730, a response is returned to the FTD API 720 at 906. Then the cached result is returned to the caller, FTD API user 710 at 908.

The in-memory cache system disclosed herein provides improved performance in page load time and a decreased number of back-end calls. The improvement is seen in scenarios when the user interacts for the first time with a UI component (page load, open range dialog, open date calendar popup . . . ). However, further improvement is seen in the repetition of those actions (for example reopening of a range dialog or going backward and forward between years in the calendar dialog), where the number of calls to the back end would be zero since the response will be served directly by the in-memory cache.

Figure 10:
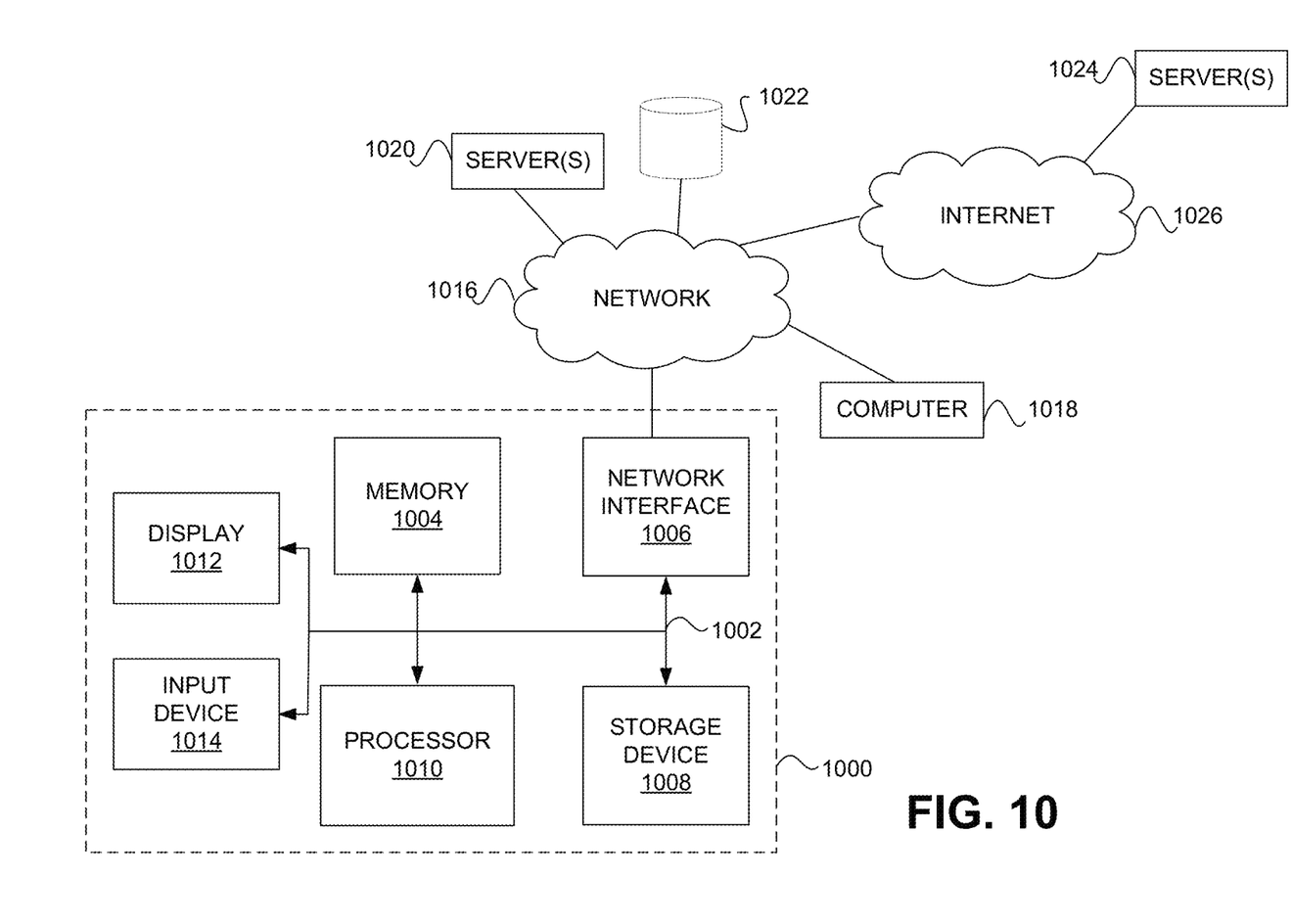
FIG. 10 is a diagram illustrating a sample computing device architecture for implementing various aspects described herein.

FIG. 10 is a diagram illustrating a sample computing device architecture for implementing various aspects described herein. Computer 1000 can be a desktop computer, a laptop computer, a server computer, a mobile device such as a smartphone or tablet, or any other form factor of general- or special-purpose computing device containing at least one processor. Computer 1000 may be client 110 as described above. Depicted with computer 1000 are several components, for illustrative purposes. Certain components may be arranged differently or be absent. Additional components may also be present. Included in computer 1000 is system bus 1002, via which other components of computer 1000 can communicate with each other. In certain embodiments, there may be multiple busses or components may communicate with each other directly. Connected to system bus 1002 is processor 1010. Also attached to system bus 1002 is memory 1004, which may include in-memory cache 120. Also attached to system bus 1002 is display 1012. In some embodiments, a graphics card providing an input to display 1012 may not be a physically separate card, but rather may be integrated into a motherboard or processor 1010. The graphics card may have a separate graphics-processing unit (GPU), which can be used for graphics processing or for general purpose computing (GPGPU). The graphics card may contain GPU memory. In some embodiments no display is present, while in others it is integrated into computer 1000. Similarly, peripherals such as input device 1014 is connected to system bus 1002. Like display 1012, these peripherals may be integrated into computer 1000 or absent. Also connected to system bus 1002 is storage device 1008, which may be any form of computer-readable media, such as non-transitory computer readable media, and may be internally installed in computer 1000 or externally and removably attached.

Computer-readable media include both volatile and nonvolatile media, removable and nonremovable media, and contemplate media readable by a database. For example, computer-readable media include (but are not limited to) RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data temporarily or permanently. However, unless explicitly specified otherwise, the term "computer-readable media" should not be construed to include physical, but transitory, forms of signal transmission such as radio broadcasts, electrical signals through a wire, or light pulses through a fiber-optic cable. Examples of stored information include computer-useable instructions, data structures, program modules, and other data representations.

Finally, network interface 1006 is also attached to system bus 1002 and allows computer 1000 to communicate over a network such as network 1016. Network interface 1006 can be any form of network interface known in the art, such as Ethernet, ATM, fiber, Bluetooth, or Wi-Fi (i.e., the Institute of Electrical and Electronics Engineers (IEEE) 802.11 family of standards). Network interface 1006 connects computer 1000 to network 1016, which may also include one or more other computers, such as computer 1018, and network storage, such as cloud network storage, and one or more servers 1020 (such as server 130). Network 1016 is in turn connected to public Internet 1026, which connects many networks globally. In some embodiments, computer 1000 can itself be directly connected to public Internet 1026.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system can include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "computer-readable medium" refers to any computer program product, apparatus and/or device, such as for example magnetic discs, optical disks, memory, and Programmable Logic Devices (PLDs), used to provide machine instructions and/or data to a programmable processor, including a computer-readable medium that receives machine instructions as a computer-readable signal. The term "computer-readable signal" refers to any signal used to provide machine instructions and/or data to a programmable processor. The computer-readable medium can store such machine instructions non-transitorily, such as for example as would a non-transient solid-state memory or a magnetic hard drive or any equivalent storage medium. The computer-readable medium can alternatively or additionally store such machine instructions in a transient manner, for example as would a processor cache or other random-access memory associated with one or more physical processor cores.

Many different arrangements of the various components depicted, as well as components not shown, are possible without departing from the scope of the claims below. Embodiments have been described with the intent to be illustrative rather than restrictive. Alternative embodiments will become apparent to readers of this disclosure after and because of reading it. Alternative means of implementing the aforementioned can be completed without departing from the scope of the claims below. Certain features and sub-combinations are of utility and may be employed without reference to other features and sub-combinations and are contemplated within the scope of the claims. Although described with reference to the embodiments illustrated in the attached drawing figures, it is noted that equivalents may be employed, and substitutions made herein without departing from the scope as recited in the claims. The subject matter of the present disclosure is described in detail below to meet statutory requirements; however, the description itself is not intended to limit the scope of claims. Rather, the claimed subject matter might be embodied in other ways to include different steps or combinations of steps similar to the ones described in this document, in conjunction with other present or future technologies. Minor variations from the description below will be understood by one skilled in the art and are intended to be captured within the scope of the present claims. Terms should not be interpreted as implying any particular ordering of various steps described unless the order of individual steps is explicitly described.

The following detailed description of embodiments references the accompanying drawings that illustrate specific embodiments in which the present teachings can be practiced. The described embodiments are intended to illustrate aspects in sufficient detail to enable those skilled in the art to practice the embodiments. Other embodiments can be utilized, and changes can be made without departing from the claimed scope. The following detailed description is, therefore, not to be taken in a limiting sense. The scope of embodiments is defined only by the appended claims, along with the full scope of equivalents to which such claims are entitled.

Having thus described various embodiments, what is claimed as new and desired to be protected by Letters Patent includes the following:

The invention claimed is:

1. One or more non-transitory computer-readable media storing computer-executable instructions that, when executed by at least one processor, perform a method for in-memory caching of data, the method comprising:
   providing an in-memory cache in a memory of a client device, the client device comprising a flexible time dimension API user component to group user interface (UI) components performing operations on flexible times, and a flexible time dimension API component, wherein flexible times correspond to user defined time hierarchies stored on a server, wherein the UI components control flexible time dimension calls and operate synchronously, and wherein the flexible time dimension API component provides access to the server for the grouped UI components performing operations on flexible times;
   sending, by the flexible time dimension API component, a first synchronous flexible time request for a first flexible time data item from the client device to the in-memory cache;
   receiving, by the flexible time dimension API component, a null response indicating that the first flexible time data item is not in the in-memory cache;
   in response to the flexible time dimension API component determining that the first flexible time data item is not in the in-memory cache, sending, by the flexible time dimension API component, a second request from the client device for the first flexible time data item to a server;
   receiving, by the flexible time dimension API component, a response from the server with the first flexible time data item to the client device;
   sending, by the flexible time dimension API component, the first flexible time data item to the in-memory cache;
   storing the first flexible time data item in the in-memory cache;
   sending, by the flexible time dimension API component, a subsequent request for the first flexible time data item from the client device to the in-memory cache; and
   receiving, by the flexible time dimension API component, the first flexible time data item from the in-memory cache.

2. The non-transitory computer-readable media of claim 1, the method further comprising:
   sending a first request for a second data item from the client device to the in-memory cache;
   receiving a null response;
   sending a second request from the client device for the second data item to the server;
   receiving a response from the server with the second data item to the client device;
   sending the second data item to the in-memory cache; and
   storing the second data item in the in-memory cache.

3. The non-transitory computer-readable media of claim 2, the method further comprising:
   sending a subsequent request for the second data item from the client device to the in-memory cache; and
   receiving the second data item from the in-memory cache, thereby eliminating an additional request for the second data item to the server,
   wherein the second data item is associated with a flexible time dimension.

4. The non-transitory computer-readable media of claim 3, wherein the subsequent request for the first flexible time data item and the subsequent request for the second data item are synchronous calls.

5. The non-transitory computer-readable media of claim 2, the method further comprising:
   applying a least recently used (LRU) eviction policy to the in-memory cache when a memory limit is reached.

6. The non-transitory computer-readable media of claim 1, wherein the in-memory cache is part of an information access infrastructure.

7. The non-transitory computer-readable media of claim 1, wherein the method enables synchronous calls in an information access infrastructure.

8. A method for in-memory caching of data, the method comprising:
   providing an in-memory cache in a memory of a client device, the client device comprising a flexible time dimension API user component to group user interface (UI) components performing operations on flexible times, and a flexible time dimension API component, wherein flexible times correspond to user defined time hierarchies stored on a server, wherein the UI components control flexible time dimension calls and operate synchronously, and wherein the flexible time dimension API component provides access to the server for the grouped UI components performing operations on flexible times;
   sending, by the flexible time dimension API component, a first synchronous flexible time request for a first flexible time data item from the client device to the in-memory cache;
   receiving, by the flexible time dimension API component, a null response indicating that the first flexible time data item is not in the in-memory cache;
   in response to the flexible time dimension API component determining that the first flexible time data item is not in the in-memory cache, sending, by the flexible time dimension API component, a second request from the client device for the first flexible time data item to a server;
   receiving, by the flexible time dimension API component, a response from the server with the first flexible time data item to the client device;
   sending, by the flexible time dimension API component, the first flexible time data item to the in-memory cache;
   storing the first flexible time data item in the in-memory cache;
   sending, by the flexible time dimension API component, a subsequent request for the first flexible time data item from the client device to the in-memory cache; and
   receiving, by the flexible time dimension API component, the first flexible time data item from the in-memory cache.

9. The method of claim 8, further comprising:
sending a first request for a second data item from the client device to the in-memory cache;
receiving a null response;
sending a second request from the client device for the second data item to the server;
receiving a response from the server with the second data item to the client device;
sending the second data item to the in-memory cache; and
storing the second data item in the in-memory cache.

10. The method of claim 9, further comprising:
sending a subsequent request for the second data item from the client device to the in-memory cache; and
receiving the second data item from the in-memory cache, thereby eliminating an additional request for the second data item to the server,
wherein the second data item is associated with a flexible time dimension.

11. The method of claim 10, wherein the subsequent request for the first flexible time data item and the subsequent request for the second data item are synchronous calls.

12. The method of claim 8, further comprising:
applying a least recently used (LRU) eviction policy to the in-memory cache when a memory limit is reached.

13. The method of claim 8, wherein the in-memory cache is part of an information access infrastructure.

14. The method of claim 8, further comprising enabling synchronous calls in an information access infrastructure.

15. A system for in-memory caching of data, the system comprising:
at least one processor; and
at least one non-transitory memory storing computer executable instructions that when executed by the at least one processor cause the system to carry out actions comprising:
providing an in-memory cache in a memory of a client device, the client device comprising a flexible time dimension API user component to group user interface (UI) components performing operations on flexible times, and a flexible time dimension API component, wherein flexible times correspond to user defined time hierarchies stored on a server, wherein the UI components control flexible time dimension calls and operate synchronously, and wherein the flexible time dimension API component provides access to the server for the grouped UI components performing operations on flexible times;
sending, by the flexible time dimension API component, a first synchronous flexible time request for a first flexible time data item from the client device to the in-memory cache;
receiving, by the flexible time dimension API component, a null response indicating that the first flexible time data item is not in the in-memory cache;
in response to the flexible time dimension API component determining that the first flexible time data item is not in the in-memory cache, sending, by the flexible time dimension API component, a second request from the client device for the first flexible time data item to a server;
receiving, by the flexible time dimension API component, a response from the server with the first flexible time data item to the client device;
sending, by the flexible time dimension API component, the first flexible time data item to the in-memory cache;
storing the first flexible time data item in the in-memory cache;
sending, by the flexible time dimension API component, a subsequent request for the first flexible time data item from the client device to the in-memory cache; and
receiving, by the flexible time dimension API component, the first flexible time data item from the in-memory cache.

16. The system of claim 15, the instructions further comprising:
sending a first request for a second data item from the client device to the in-memory cache;
receiving a null response;
sending a second request from the client device for the second data item to the server;
receiving a response from the server with the second data item to the client device;
sending the second data item to the in-memory cache; and
storing the second data item in the in-memory cache.

17. The system of claim 16, the instructions further comprising:
sending a subsequent request for the second data item from the client device to the in-memory cache; and
receiving the second data item from the in-memory cache, thereby eliminating an additional request for the second data item to the server.

18. The system of claim 17, wherein the subsequent request for the first flexible time data item and the subsequent request for the second data item are synchronous calls.

19. The system of claim 15, the instructions further comprising:
applying a least recently used (LRU) eviction policy to the in-memory cache when a memory limit is reached.

20. The system of claim 15, wherein the in-memory cache is part of an information access infrastructure.

* * * * *